United States Patent

Noirot et al.

[11] Patent Number: 6,054,087
[45] Date of Patent: *Apr. 25, 2000

[54] PROCESS FOR INCLUDING A DECORATION, PARTICULARLY A TEXTILE DECORATION, IN A PIECE OF PLASTIC MATERIAL

[75] Inventors: Daniel Noirot, Liesse; Olivier Vitrant, Warmerville, both of France

[73] Assignee: Centre d'Etudes et Recherche pour l'Automobile (Cera), Reims, France

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/451,929

[22] Filed: May 26, 1995

[30] Foreign Application Priority Data

May 26, 1994 [FR] France ................................. 94 06382
Feb. 7, 1995 [FR] France ................................. 95 01383

[51] Int. Cl.$^7$ ........................... B29C 45/13; B29C 45/14
[52] U.S. Cl. ...................... 264/251; 264/254; 264/255; 264/257; 264/266; 264/278; 425/111; 425/125; 425/127; 425/129.1
[58] Field of Search ..................... 264/510, 132, 264/255, 257, 266, 251, 254, 278, 275; 425/111, 127, 125, 129.1

[56] References Cited

U.S. PATENT DOCUMENTS

| 2,357,950 | 9/1944 | Goessling | 264/255 |
|---|---|---|---|
| 3,122,598 | 2/1964 | Berger | 264/132 |
| 3,530,022 | 9/1970 | Mallory | 264/255 |
| 3,651,191 | 3/1972 | Glatt et al. | 264/132 |
| 3,953,932 | 5/1976 | Graves | 40/27.5 |
| 4,275,030 | 6/1981 | Mares | 264/255 |
| 4,360,329 | 11/1982 | Hatakeyana | 264/132 |
| 5,164,140 | 11/1992 | Siano | 264/257 |
| 5,618,567 | 4/1997 | Hara et al. | 425/111 |

FOREIGN PATENT DOCUMENTS

| 0482270 | 4/1992 | European Pat. Off. . |
|---|---|---|
| 2271956 | 5/1994 | European Pat. Off. . |
| 0636464 | 2/1995 | European Pat. Off. . |
| 2601618 | 1/1988 | France . |
| 63-41116 | 2/1988 | Japan . |
| 2271956 | 5/1994 | United Kingdom . |

OTHER PUBLICATIONS

Abstract of FR 2,601,618 (one page in English).

Abstract of EPO 636,464 (one page in English).

Patent Abstracts of Japan, vol. 12, No. 257 (M–719) (3104) Jul. 20, 1988.

*Primary Examiner*—Jan H. Silbaugh
*Assistant Examiner*—Edmund H. Lee
*Attorney, Agent, or Firm*—Graham & James LLP

[57] ABSTRACT

A decorative sheet including a decoration and a process for forming the sheet are disclosed. This process comprises the following steps:

using a mold consisting of at least two parts, at least one part of which is formed of at least two elements, at least one element (5) corresponding to the medallion and at least one other element (6) corresponding to the periphery of the piece, around the medallion;

placing the decorative sheet (20) on the element corresponding to the medallion and closing the mold;

within the cavity of the mold, isolating the space (23) located below the decorative sheet from the peripheral space (21);

injecting plastic material in succession into the spaces thus isolated; and ejecting the piece obtained.

4 Claims, 8 Drawing Sheets

PROCESS FOR INCLUDING A DECORATION, PARTICULARLY A TEXTILE DECORATION, IN A PIECE OF PLASTIC MATERIAL

BACKGROUND OF THE INVENTION

1. Field of the Invention

The present invention relates to a process and apparatus for including a decoration in sheet form. In particular, it relates to including a textile material, as a medallion on the surface of a piece of plastic material, as well as a mold for carrying out this process and a piece obtained by this process.

Of course, several medallions can be included by the present process, either simultaneously or one after the other, in the same piece, which, in its turn, can be formed of one or more parts.

2. Discussion of Related Art

Such pieces are, for instance, known in the automobile industry. Thus, certain door fittings present visibly, that is to say from the interior of the vehicle, the aspect of a piece of plastic material having, inserted in its surface, or, stated differently, as a medallion, a decoration in sheet form, for instance of fabric, at the level of the arm rest. Plastic material also serves as support for the sheet decoration, that is to say forms the volume of the arm rest proper, and is therefore not directly visible. Another insert can form the bottom of the door.

Generally, the peripheral part of plastic material, without decoration other than its own surface finish and the medallion, formed of the sheet decoration and its plastic support material, are made separately and then assembled, either directly or later on, for instance by means of fasteners. The medallion itself is obtained by molding the plastic support material over the decoration.

Such processes entail numerous operations as well as numerous restarts between the different operations, which result in a number of drawbacks.

There has also been proposed, in British A-227 1956, a process for including a sheet decoration, particularly of textile, as a medallion in the surface of a piece of plastic material which comprises the steps consisting:

- of using a mold comprising at least two parts, at least one part of which is formed of at least two elements, at least one element corresponding to the medallion and at least one other element corresponding to the periphery of the piece, around the insert;
- in bringing the decorative sheet onto the element corresponding to the medallion and closing the mold;
- in isolating, within the mold cavity, the space located below the decorative sheet from the peripheral space, using a mold the part of which comprising said elements includes at least one third annular element surrounding the element corresponding to the medallion and adapted to apply itself against the other part of the mold;
- in injecting plastic material in succession into the spaces thus isolated; and
- in ejecting the resultant piece.

This process has the drawback that the different parts of the piece are simply juxtaposed, the decoration being merely glued onto one of these parts. Thus, on the one hand, the connection between these parts is weak and, on the other hand, the decoration is fastened to the piece in a manner which is not very firm.

SUMMARY OF THE INVENTION

The present invention is directed at overcoming these drawbacks. More particularly, the object of the invention is to provide means which make it possible, with a minimum number of operations, to include on the surface of a piece of plastic material one or more decorative sheets, for instance of textile material, whether or not preshaped, the different portions of the piece being firmly attached to each other, and the decoration being firmly fastened to the piece.

For this purpose, the object of the invention is, first of all, a process of the aforementioned type characterized by the fact that, upon closing the mold, the edge of the decorative sheet is pinched between the other part of the mold and said third element.

Thus, the edge of the decorative sheet extends through the finished piece, passing from one of its sides to the other at the junction between the plastic material of the medallion and that of the periphery. It therefore assures an adherence bond between the portion of the piece on which it is placed and the peripheral portion. It is furthermore itself held firmly due to its being pinched.

Of course, when reference is had in the present description to a fixed or movable part, these terms are relative and one or the other of the parts may be considered fixed and the other movable.

In one particular embodiment, the plastic material is first of all injected into the space located below the decorative sheet.

This is, in practice, the solution which will preferably be adopted in the case of a decorative sheet of textile material or, more generally, of material which is not impermeable to the plastic material injected. One can then adopt a higher injection pressure in the peripheral space than in the central space corresponding to the medallion, which makes it possible to obtain a satisfactory bonding of the plastic material to the decorative sheet without the danger of passing through the latter.

Another object of the invention is a mold for the manufacture of a piece of plastic material having, as medallion on its surface, at least one decorative sheet insert, particularly of textile, comprising at least two parts, defining an injection cavity between each other. A first part comprising at least two elements, at least one of these elements corresponding to the medallion, and at least one other element corresponding to the periphery of the piece, around the medallion, the mold furthermore comprising sealing means which isolate, in said injection cavity, a first injection space located opposite the element corresponding to the medallion from a second injection space located opposite the element corresponding to the periphery of the piece, characterized by the fact that said elements corresponding to the medallion and the periphery of the piece respectively are firmly attached to each other, the second part of the mold supporting a medallion cavity opposite the element corresponding to the medallion, and a peripheral part cavity mounted independently between said first part and said second part.

Of course, what has been stated above with regard to the relative character of the fixed and movable parts of the mold applies here also.

In one particular embodiment, said first part of the mold comprises at least one third annular element surrounding the element corresponding to the medallion and adapted to applying itself against the second part of the mold in order to isolate said first injection space from said second injection space.

More particularly, said third element can be adapted to slide between the element corresponding to the medallion and the element corresponding to the peripheral part of the mold.

This third element, which therefore forms a peripheral rest for the medallion, makes it possible to delimit and isolate for the injection the space corresponding to the latter from the peripheral space. In the event that it is slidable, the outer surface of the piece can be smooth; otherwise, this surface forms a groove around the medallion.

In order to optimize the attachment of the medallion to the periphery of the piece of plastic material, the mold may advantageously have spaced notches formed in the region where the two injection spaces face each other on opposite sides of the decorative sheet.

Typically, the distance between said notches is less than about 1 mm for a sheet decoration of plastic film, between about 1 to 3 mm for a sheet decoration of textile of tight structure, for instance fine-knit textile, and between about 3 and 5 mm for a sheet decoration of loose structure, for instance of warp and filling.

The depth of the notches may be between 1 and 5 mm and, for instance, be on the order of the distance between notches.

Another object of the present invention is a piece of plastic material comprising, as medallion, at least one sheet decoration, in particular of textile, characterized by the fact that the decorative sheet passes through the piece at the periphery of the medallion.

The plastic material forming the periphery of the piece and the plastic material forming the support of the decorative sheet can join each other in the thickness of the decorative sheet, in particular substantially at the middle of said thickness.

The unity of the piece is therefore established either through the decorative sheet or by means of it. The first case is that in which said sheet is capable of being penetrated by the injected plastic material, for instance when it consists of textile material. The second case is present when the decorative sheet is impermeable to the plastic material injected; the unity is then obtained by the adherence onto this sheet of the material injected from its two sides.

One particular embodiment of the invention will now be described, by way of illustration and not of limitation, with reference to the accompanying diagrammatic drawings, in which:

BRIEF DISCUSSION OF THE DRAWINGS

Figure 1:
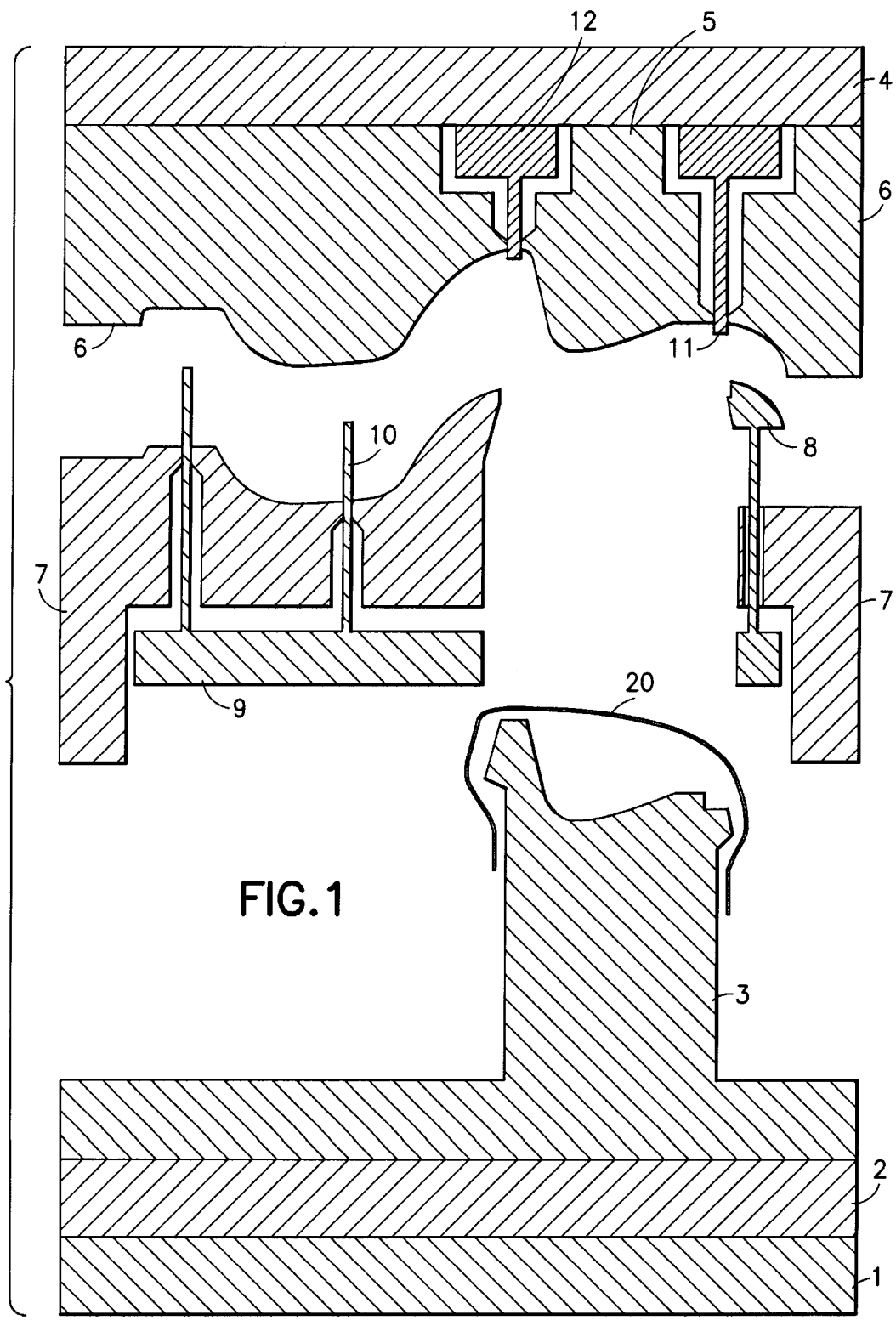
FIGS. 1 to 7 are top views in cross section of a mold in accordance with the invention, illustrating the different steps of its use in the manufacture of a door panel for an automotive vehicle.

The mold shown in the figures comprises a stationary mold end plate containing, in particular, clamping cylinders.

DETAILED DESCRIPTION OF A PREFERRED EMBODIMENT

A system of known type for cascade multi-point injection is associated here with a mold. In such a system, the points of injection are multiplied and their respective opening and closing are controlled in suitable manner. The plastic material is distributed by a number of hot channels which are supported by a support plate 2 mounted on the mold end plate 1.

The support plate 2 also receives a stationary medallion cavity 3 intended to shape the back of the plastic support material of the decorative sheet. The movable part of the mold comprises, first of all, a movable mold end plate 4 bearing the movable medallion cavity 5 as well as the part 6 of the peripheral cavity intended to shape the place of the peripheral portion of the panel. It is therefore this part 6 of the mold which gives its finished aspect to the part of plastic material of the panel.

The back of this part of plastic material is shaped by means of an intermediate cavity 7 a part of which, in the present case, is formed of a core 8. The intermediate cavity 7 bears the ejection device 9 actuating the ejectors 10. The core 8, in this case, itself constitutes an ejector and is therefore also driven by the device 9.

Figure 8:
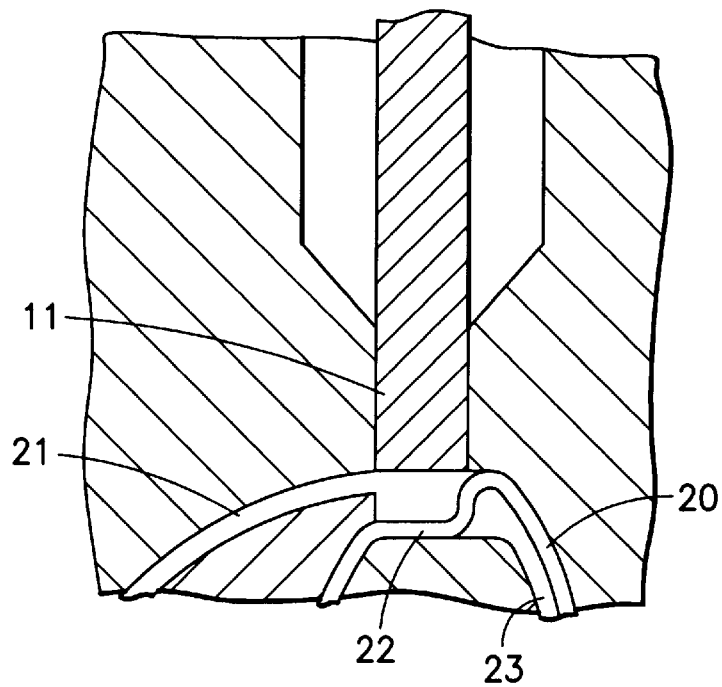
FIG. 8 is a view on a larger scale of a detail from FIG. 3.

A medallion rest 11 is formed of a tubular element the cross section of which corresponds to the projection of the periphery of the medallion parallel to the generatrices of the tube. The rest is adapted to slide between the cavities 5 and 6. Actuating means 12 are provided for this purpose, they making it possible to displace the rest from an extended position, shown, for instance, in FIG. 1, where its free edge extends beyond the cavities 5 and 6, to a retracted position, shown for instance in FIGS. 3 and 8.

The molding of a door panel is effected in the following manner. The person skilled in the art will know how to mount the different component elements of the mold on the injection press in order to obtain the movements described below.

The mold is first of all opened in the position shown in FIG. 1. The cavity 7 is in intermediate position between the stationary part of the mold and the part of the mold integral with the movable end plate 4 of the mold. The ejectors are extended, having been used at the end of the previous cycle. The rest 11 is in retracted position. The decorative sheet 20 is put in place on the medallion cavity 3.

Figure 2:
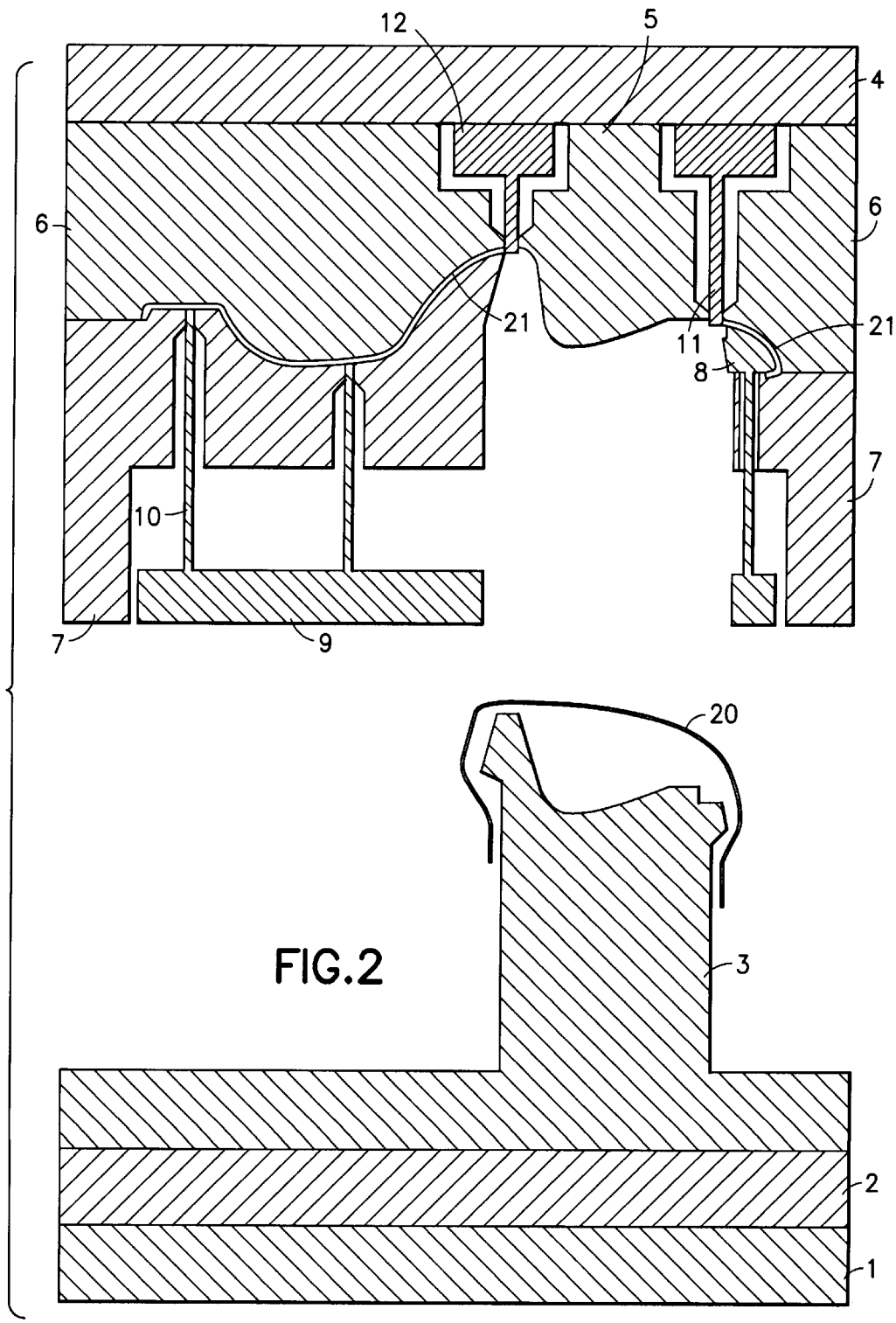

As shown in FIG. 2, the ejectors 10 are then retracted and the main joint plane is closed by bringing the periphery of the cavity 7 in abutment against the periphery of the cavity 8.

Figure 3:
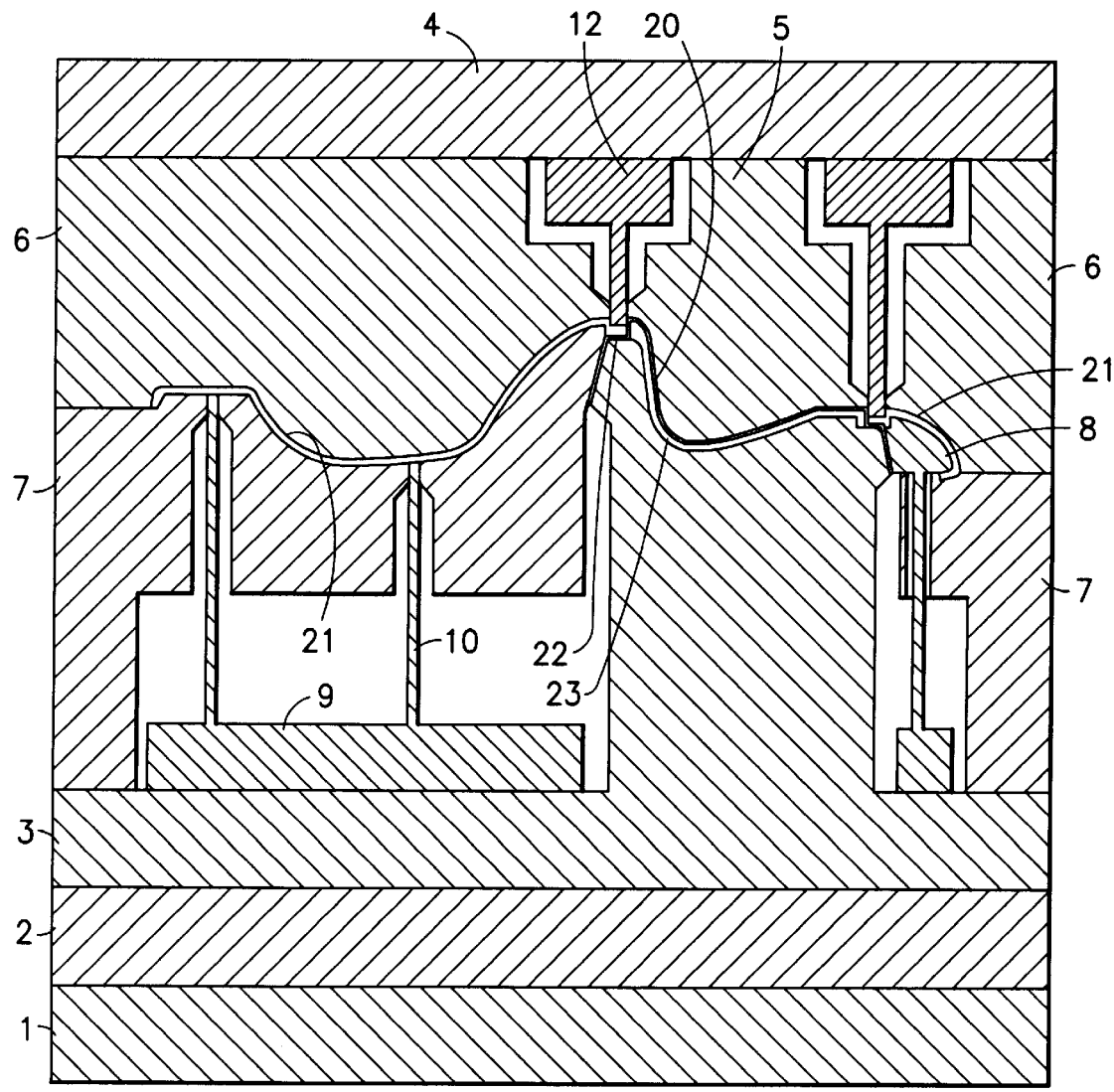

In the step shown in FIG. 3, the auxiliary joint plane is closed, which has the effect of completely closing the mold. This is effected by displacing all of the movable parts in the direction towards the fixed part until they abut against each other. It is during this step that the decorative sheet 20 is shaped, if this has not been done previously in an independent step.

Figure 4:
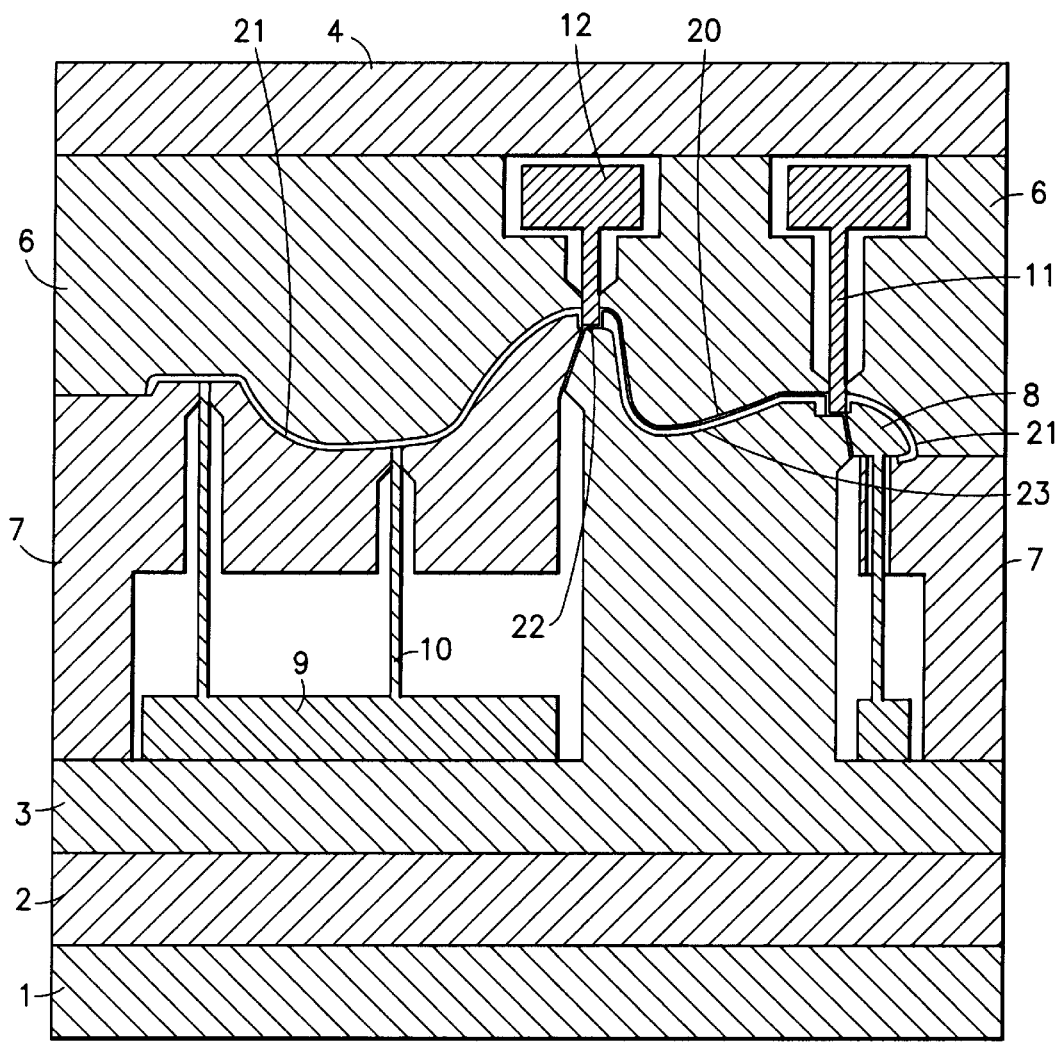

In FIG. 4, the rest 11 is first of all extended. This operation having been effected, the stop contours of the cavities 6 and 7, the facing surfaces of the cavities 8 and 7 with the core 8 of the latter, and the rest 11 define an injection space 21 corresponding to the peripheral part of the panel. Another injection space 23 is defined by the facing surfaces of the sheet 20 and the cavity 3, and by the rest 11.

At the same time, the edge 22 of the sheet 20 is clamped between the stationary medallion cavity 3 and the free edge of the rest 11. Plastic material is then injected into the space 23.

Figure 5:
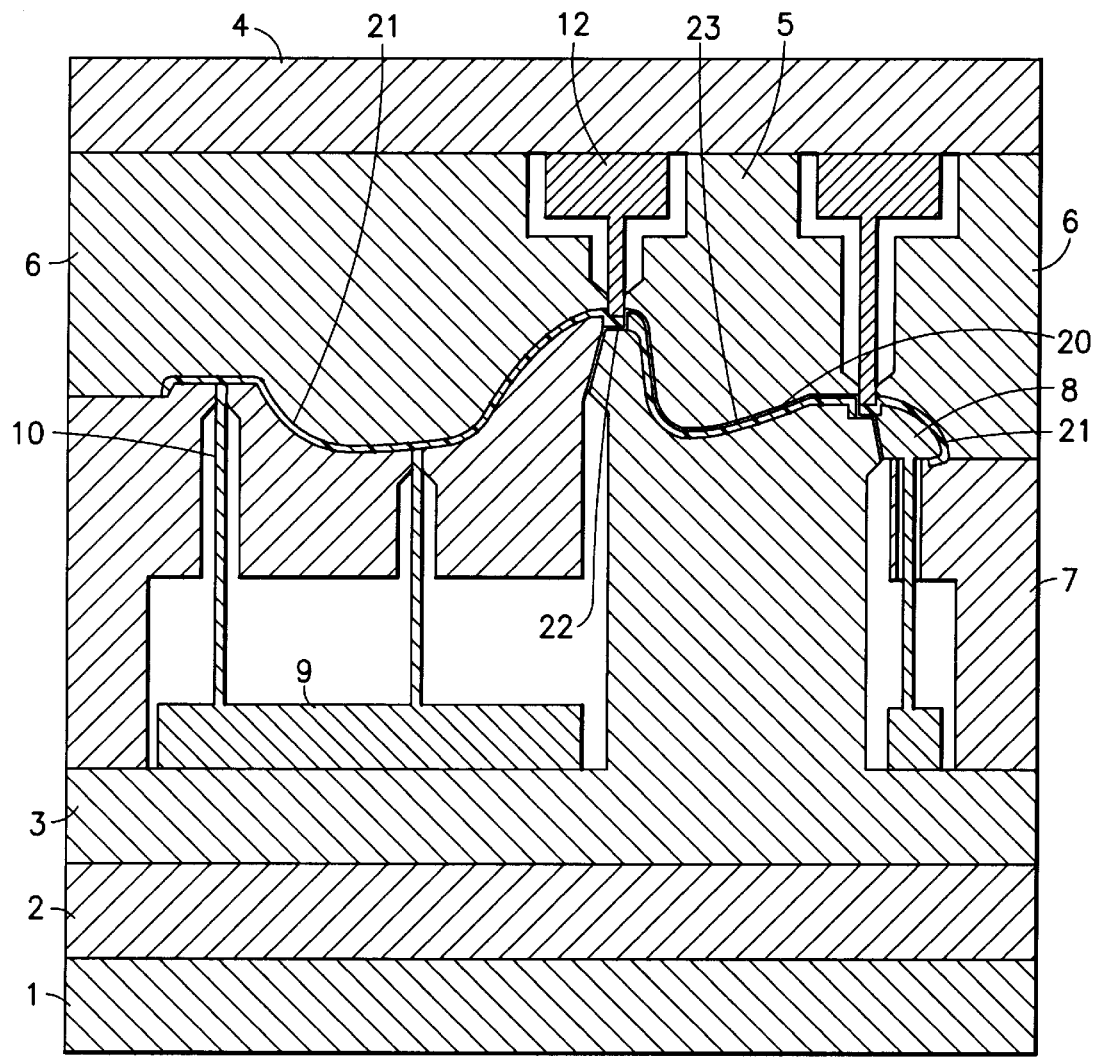

In FIG. 5, the rest is again retracted and plastic material is then injected into the space 21. This plastic material therefore also fills up the space left free by the rest 11, so that, in the finished panel, the passage will take place without transition in level between the plastic material of the peripheral part of the panel and the decorative sheet 20.

Figure 6:
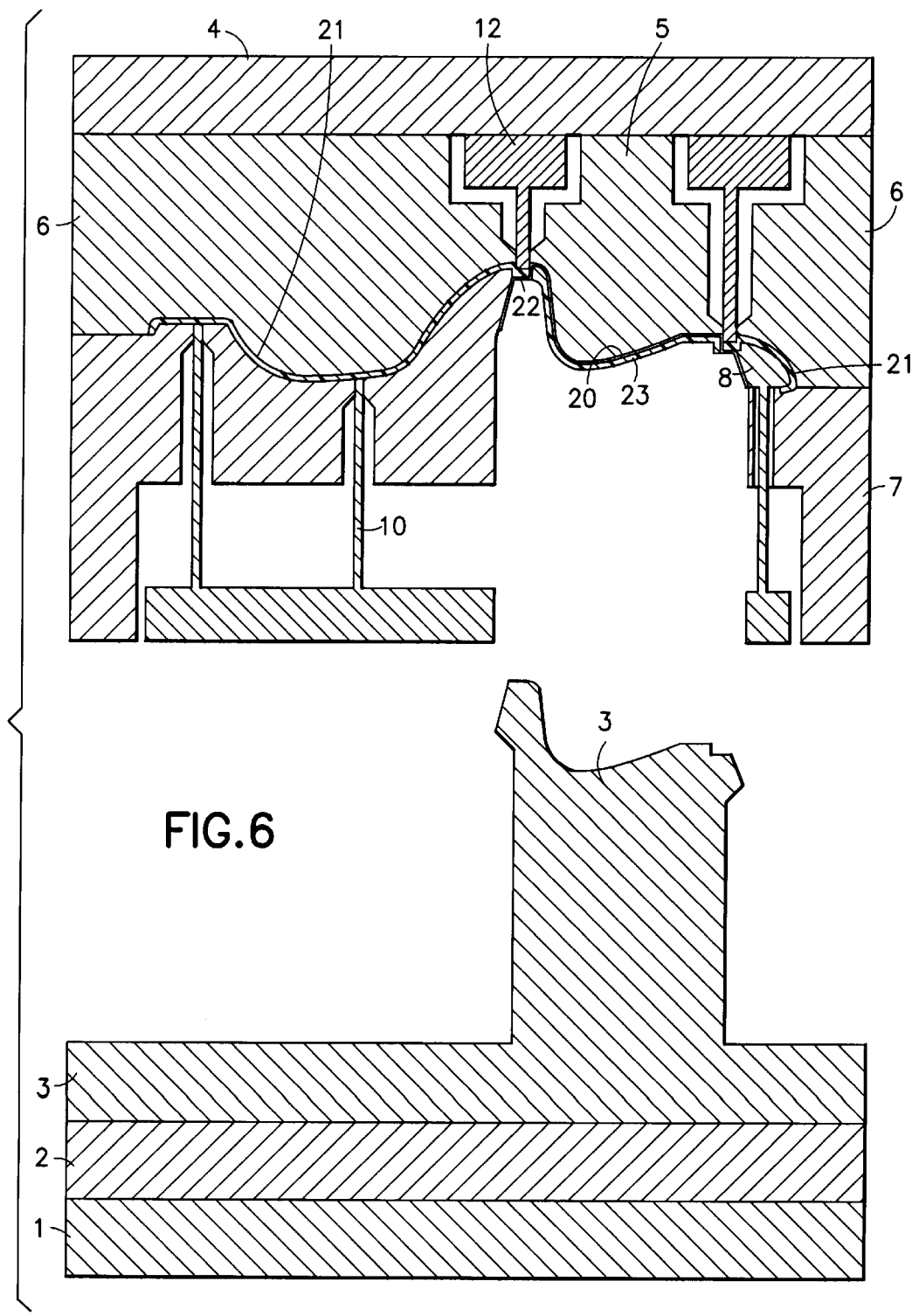

In the step shown in FIG. 6, the plane of the auxiliary joint is again open.

Figure 7:
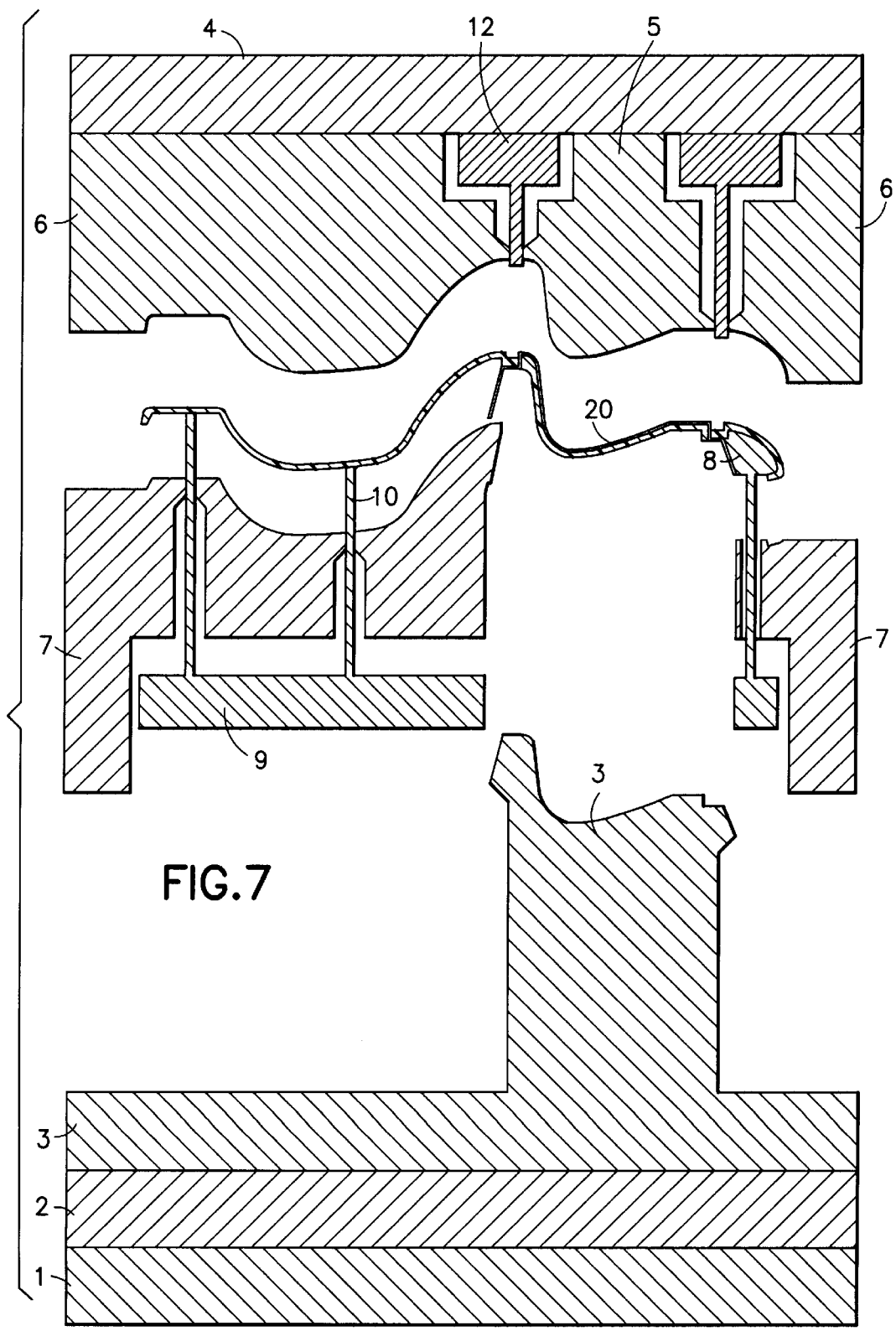

Finally, in FIG. 7, the main joint plane is also open and the ejectors 10 are actuated, thus causing the removal of the panel from the mold. The device is returned to its original position, in which a new decorative sheet can be put in place for the production of the following panel.

Figure 9:
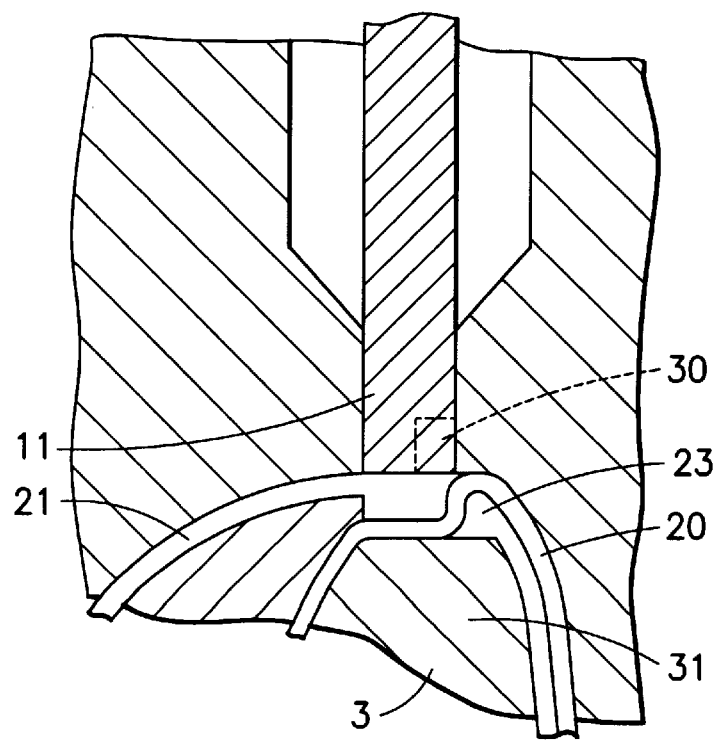
FIG. 9 is a view similar to FIG. 8 of another embodiment.

In the embodiment shown in FIG. 9, the rest 11 has spaced notches 30 formed along its edge, on the side facing the medallion. Upon the injection of the plastic material into the space 23 (FIG. 4), the decorative sheet 20 is passed through at the location of these notches, or even bursts under the action of the pressure if it is sufficiently tight to said plastic material.

As a result, when the cavity 21 is injected, a better attachment of the medallion to the peripheral part of the piece is obtained.

As a variant, the notches could be formed at a different place in the zone where the injection cavities 31 and 23 are on opposite sides of the decorative sheet 20, for instance in the upper part 31 of the part 6 of the mold facing the edge of the rest 11.

We claim:

1. A process for including a decorative sheet as a medallion in a surface of a piece of plastic material, comprising the following steps:
   a) providing a mold, having a mold cavity and comprising at least two parts, at least one of the at least two parts being formed of at least two elements, at least one of the at least two elements corresponding in shape to the medallion and another of the at least two other elements corresponding to a periphery of the piece of plastic material, around the medallion, and another of the at least two parts comprising at least one additional annular element that is configured to surround the at least one element corresponding in shape to the medallion and adapted to be applied against the at least one element corresponding in shape to the medallion;
   b) placing a decorative sheet having a peripheral edge onto the at least one of the at least one elements corresponding to the shape of the medallion;
   c) closing the mold thereby isolating, within the mold cavity, a first space, located below the decorative sheet, from a second space peripheral to the first space, by using the at least one additional annular element to clamp the peripheral edge of the decorative sheet between the at least one additional annular element and the at least one of the at least one elements corresponding to the shape of the medallion;
   d) injecting plastic in succession into the first space and the second space, against the decoration sheet, wherein the injected plastic in the first space and the injected plastic in the second space are isolated from each other by the decorative sheet; and
   e) ejecting the piece of plastic material having the medallion obtained.

2. The process according to claim 1 in which the plastic is first injected into the space located below the decorative sheet.

3. The process according to claim 1, wherein the medallion is comprised of a textile.

4. The process according to claim 1, wherein the step of injecting plastic in succession into the first space and the second space, results in a periphery of the medallion extending through the piece of plastic material.

* * * * *